June 20, 1961 A. H. BOHR 2,989,271
VERTICAL RISING AIRCRAFT
Filed June 9, 1958 2 Sheets-Sheet 1
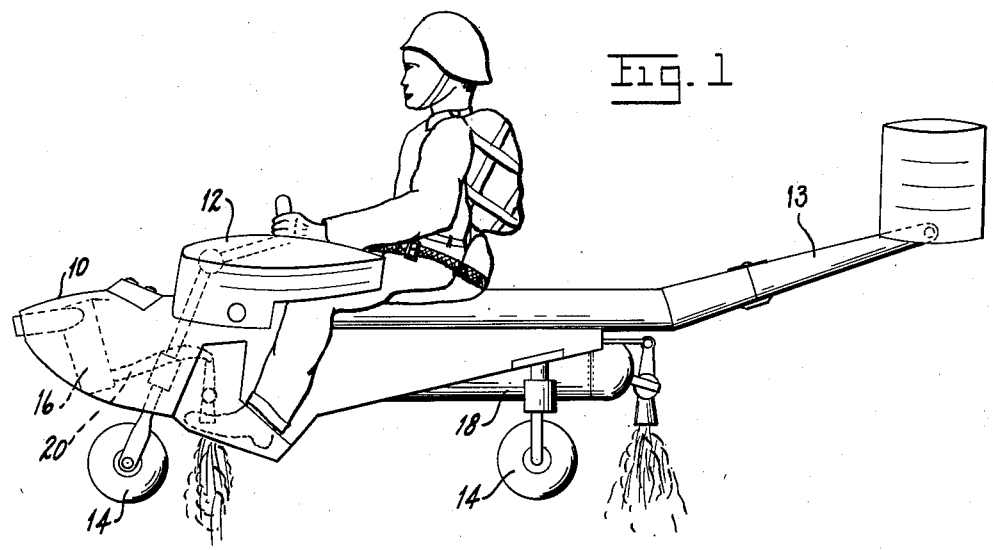
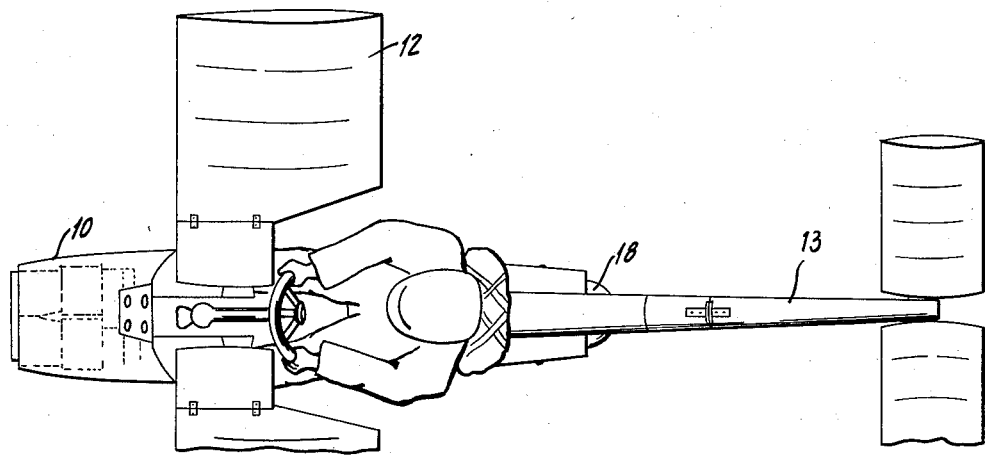
INVENTOR.
ALEXANDER H. BOHR
BY *William R. Wright*
HIS AGENT

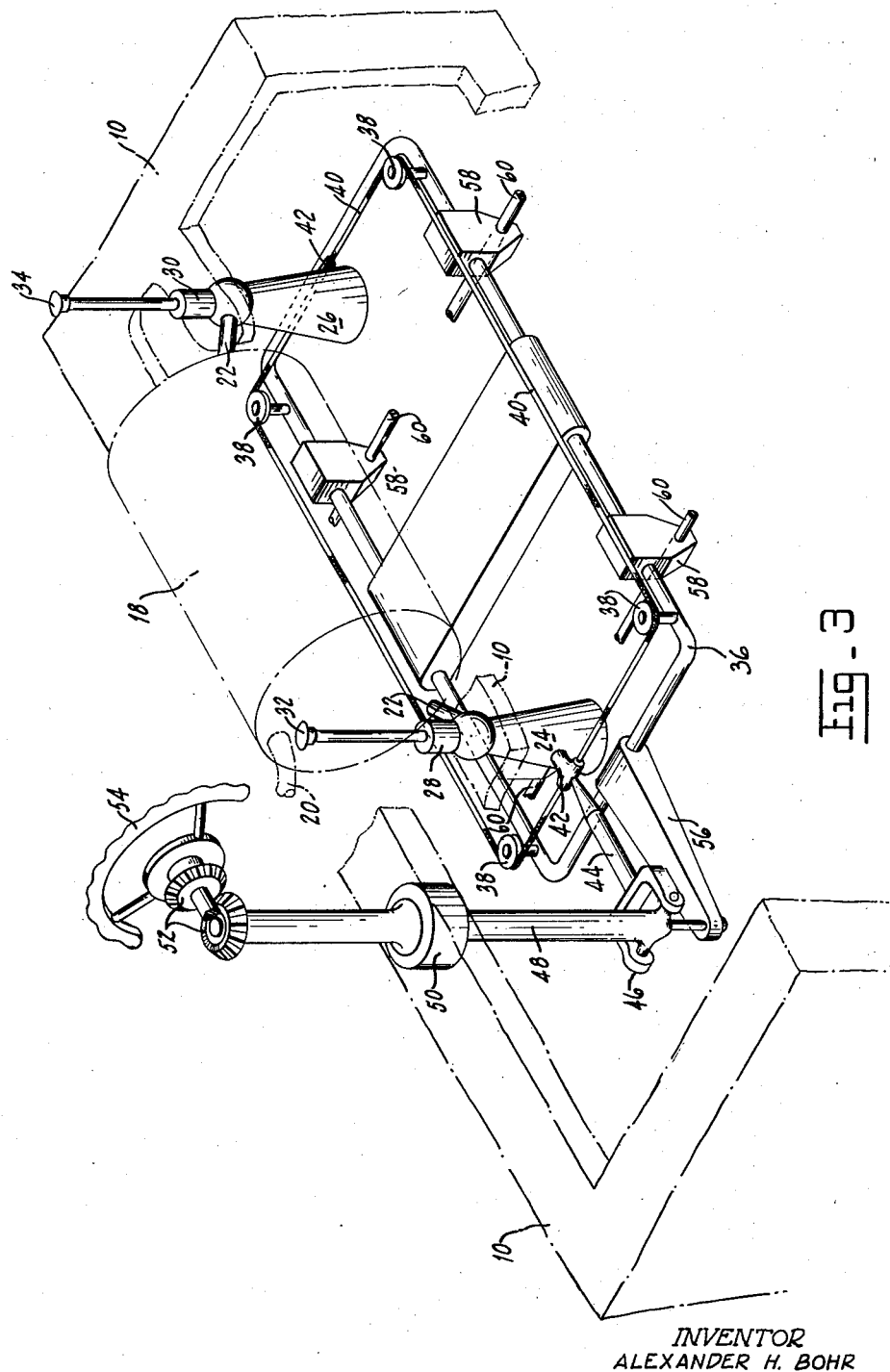

United States Patent Office 2,989,271
Patented June 20, 1961

2,989,271
VERTICAL RISING AIRCRAFT
Alexander H. Bohr, Sparta, N.J., assignor to Thiokol Chemical Corporation, Bristol, Pa., a corporation of Delaware
Filed June 9, 1958, Ser. No. 740,965
7 Claims. (Cl. 244—23)

The present invention relates to aircraft propulsion devices and particularly to devices for effecting vertical lift and flight control of aircraft.

The principal object of the invention is to provide an improved jet propelled aircraft wherein the thrust nozzles are mounted in a novel manner and controlled to provide a wide variation of operating conditions.

In carrying out the object of the invention, a suitable aircraft having a frame and power source is provided with a hot gas accumulator from which the gases providing propulsion are directed to a pair of jet nozzles. These nozzles are swiveled in the aircraft frame and normally directed downwardly to provide upward thrust and vertical rise, when the nozzles are connected to the source of energy. A sub-frame supported on the aircraft frame is movable in all directions in a horizontal plane and through connection with the free ends of the jet nozzles will tilt them in parallel from the vertical to positions in which they point forward, to the rear, or to either side so as to direct thrust against the aircraft accordingly.

A further feature of the invention resides in the provision of devices incorporated in the sub-frame to effect opposite tilting of the pair of jet nozzles, while they are in any of their several positions to impart a rotative action so that the aircraft will turn while rising, advancing or moving laterally or backwards.

By disconnecting the forward nozzle and tilting the rear nozzle to a position for forward thrust, the aircraft can be driven as a land vehicle, on wheels provided for this purpose.

A further feature of the invention resides in the provision of a single control post which is mounted for tilting in any direction and therethrough causes corresponding tilting of the pair of jet nozzles in parallel. In addition, by rotation of the post the rotational effect is imparted by causing the aforementioned opposite tilting of the nozzles.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 1 is a schematic elevational view of the type of aircraft for which the present invention is adapted showing the general location of the jet nozzles.

FIG. 2 is a plan view of the aircraft.

FIG. 3 is a schematic isometric view of the essential elements of the apparatus for carrying out the object of the invention.

Referring to the drawings, the invention is adapted for installation in the type of small aircraft having a body 10 provided with foldable wings 12 and tail section 13. Wheels 14 provide for land travel. In the forefront of the aircraft, there is mounted the prime mover 16 which may be in the form of a positive displacement gas engine compressor and expander, in which a combustion chamber burns gasoline or jet fuel with air. The combustion chamber of the engine received air from a compressor, burns the fuel and delivers essentially hot air to the expander which extracts sufficient energy to drive a compressor and delivers the gas to an accumulator unit 18 through a conduit 20.

This gas under pressure may be produced and stored in unit 18 or in any other suitable manner. Referring to FIG. 3, the gas in accumulator 18 passes through pipes 22 to a forward jet nozzle 24 and a rear jet nozzle 26, through valves 28 and 30 equipped with control handles 32 and 34 as diagrammatically represented. By suitable controlling of valves 28, 30 the desired flow of gas is directed to the nozzles in accordance with the required thrust to be applied to the aircraft. The nozzles are supported in the framework or body 10, so as to be rotatable on their upper ball-shaped ends in a direction of the generation of a cone.

Extending around the nozzles just above their lower ends is a rectangular frame 36 having a pulley 38 pivoted at each corner, about which a cable 40 is extended as shown. Secured at opposite sections of the cable are pivot pins 42 that extend into the nozzles 24 and 26.

An arm 44 attached to the forward pin 42 has universal connection 46 to a control post 48 which is mounted in the body 10 at 50 for rocking about 50 and is also arranged to rotate about its vertical axis. The upper end of the post has bevel gear connection 52 with control wheel 54 through which the post is rotated. Bodily movement of the wheel without rotation thereof serves to rock the post in the desired direction and to the desired extent.

The lower extremity of post 48 has connection with an extension 56 integral with frame 36 so that, when the post is rocked, for example, to move its lower end in a forward direction, the frame 36 is drawn in the same forward direction, carrying with it cable 40 and through pins 42 tilting nozzles 24, 26 so that they point in a forward direction.

In a similar manner, rocking of post 48 in any other direction will cause the frame 36 to move in the same direction as the lower end of the post and tilt the nozzles to point in that direction. The frame 36 is mounted in bearings 58 for fore and aft sliding, and these bearings are in turn mounted for lateral sliding on tie rods 60 suitably secured to the main body 10.

Accordingly, when vertical rise of the aircraft is desired, post 48 is positioned to hold nozzles 24, 26 vertical and valves 28 and 30 opened to control gas jets through nozzles 24, 26 at a rate to produce the required thrust to lift the vehicle.

When it is desired to go forward, the nozzles are tilted toward the rear. For lateral movement they are tilted to the left or right and for reverse movement of the aircraft they are tilted forward. Obviously, any combination of forward, lateral or reverse lateral positioning will produce movement in an oblique direction.

If now it is desired to turn the aircraft either while hovering or while moving in any direction, wheel 54 may be rotated about its axis. This will rotate post 48 and cause arm 44 to swing through an angle with respect to extension 56. In doing so, it will move cable 40 in one direction or the other about pulleys 38 and, since pins 42 fixed on the cable are also connected to nozzles 24, 26, one nozzle will tilt in one direction and the other will tilt in the opposite direction, to rotate the aircraft about a center midway between the two nozzles for directional orientation.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the in-

What is claimed is:

1. In an aircraft having a frame, a pair of thrust nozzles adjustably mounted thereon, and a power source for creating and delivering gas under pressure to said nozzles to thereby exert a reactive force against the aircraft frame, a valve for controlling the extent of the gas flow to the nozzles, the combination therewith of mechanism for selectively positioning the longitudinal axes of said nozzles with respect to the aircraft frame, comprising a control post, mounted on said frame for universal movement about a point intermediate its ends and for rotation about its longitudinal axis and connections between the posts and said nozzles, whereby movement of the post to one position will result in positioning the nozzles to cause an upward thrust against the frame, movement to another position will result in positioning the nozzles to cause a forward thrust, movement to a third position will result in positioning the nozzles to cause a rearward thrust, movement to a fourth position will result in positioning the nozzles to cause a lateral thrust, and rotational movement about the post's longitudinal axis will cause the nozzles to tilt in directions opposite to one another to exert lateral and opposite thrust against the frame to thereby create rotation of the frame about a vertical axis intermediate the nozzles.

2. The invention set forth in claim 1 with the connection between the control post and the nozzles comprising a second frame pivotally attached to the control post and adapted for longitudinal and lateral translation, pulleys spaced upon the frame, a cable stretched about the pulleys, pivotal means attaching the cable to each of the nozzles, and an arm connecting the post to the cable to move the cable with respect to the second frame upon rotation of the post about its longitudinal axis.

3. The invention set forth in claim 2 with the second frame slidably mounted in bearing supports for fore and aft and lateral movement.

4. The invention set forth in claim 2 with the second frame being substantially rectangular in form with the pulleys substantially at the corners thereof and the nozzles adjacent the ends of the rectangular second frame.

5. The invention set forth in claim 1 with a control wheel adapted to rotate in a substantially vertical plane and engaged with the control post by gear means.

6. The invention set forth in claim 2 with the arm comprising a yoke pivotally attached to the control post in the plane of the cable and pivotally attached to the cable.

7. The invention set forth in claim 2 with the cable pivotally attached to each nozzle adjacent to the nozzle's lower end.

References Cited in the file of this patent

UNITED STATES PATENTS

| | | |
|---|---|---|
| 2,840,324 | Smith | June 24, 1958 |
| 2,926,868 | Taylor | Mar. 1, 1960 |
| 2,939,654 | Coanda | June 7, 1960 |
| 2,943,816 | Hiller | July 5, 1960 |

FOREIGN PATENTS

| | | |
|---|---|---|
| 160,981 | Australia | July 24, 1952 |